(12) United States Patent
Huang

(10) Patent No.: US 12,397,239 B2
(45) Date of Patent: Aug. 26, 2025

(54) SWINGSET

(71) Applicant: Shenzhen Paqi Technology Co., Ltd., Shenzhen (CN)

(72) Inventor: Junhui Huang, Shenzhen (CN)

(73) Assignee: Shenzhen Paqi Technology Co., Ltd., Shenzhen (CN)

(*) Notice: Subject to any disclaimer, the term of this patent is extended or adjusted under 35 U.S.C. 154(b) by 614 days.

(21) Appl. No.: 17/941,198

(22) Filed: Sep. 9, 2022

(65) Prior Publication Data

US 2024/0017183 A1 Jan. 18, 2024

(30) Foreign Application Priority Data

Jul. 12, 2022 (CN) .......................... 202221794340.2

(51) Int. Cl.
*A63G 9/00* (2006.01)
*F16B 7/18* (2006.01)

(52) U.S. Cl.
CPC .............. *A63G 9/00* (2013.01); *F16B 7/182* (2013.01)

(58) Field of Classification Search
CPC .................................. A63G 9/00; F16B 7/182
USPC ........................................................ 471/118
See application file for complete search history.

(56) References Cited

U.S. PATENT DOCUMENTS

| | | | | |
|---|---|---|---|---|
| 6,017,293 | A * | 1/2000 | Pfefferle | A63B 21/1627 482/40 |
| 6,402,631 | B1 * | 6/2002 | Gembarowicz | A63B 71/022 473/197 |
| 6,830,517 | B1 * | 12/2004 | Ciraolo | A63G 9/12 403/313 |
| 11,260,308 | B1 | 3/2022 | Chen | |
| 2009/0105002 | A1 * | 4/2009 | Kahn | A63G 9/12 472/118 |
| 2010/0012795 | A1 | 1/2010 | Spencer et al. | |
| 2012/0006271 | A1 * | 1/2012 | Van Dine | A01K 1/0353 119/28.5 |
| 2019/0184225 | A1 * | 6/2019 | Leoniak | A63B 21/154 |
| 2024/0017183 | A1 * | 1/2024 | Huang | F16B 7/182 |
| 2025/0090967 | A1 * | 3/2025 | Vargas | A63G 31/007 |

* cited by examiner

*Primary Examiner* — Allyson N Trail
(74) *Attorney, Agent, or Firm* — ScienBiziP, P.C.

(57) ABSTRACT

A swingset includes at least two support frames distributed at intervals and a connecting rod assembly configured to connect the at least two support frames. The connecting rod assembly has a length direction and includes a first connecting rod, a second connecting rod, and a reinforcing member. The first connecting rod and the second connecting rod are arranged in sequence along the length direction. The reinforcing member overlaps a joint of the first connecting rod and the second connecting rod, and the reinforcing member is detachably connected to the first connecting rod and the second connecting rod. The reinforcing member is configured to disperse force at the joint of the first connecting rod and the second connecting rod during operation of the swingset, and weaken tension at the joint during operation of the swingset.

21 Claims, 16 Drawing Sheets

SWINGSET

FIELD

The subject matter herein generally relates to playground equipments, for example, a swingset.

BACKGROUND

Traditional swingset has a long beam, which is not conducive to packaging and transportation, and can be easily bent and deformed during transportation and use, resulting in a shortened service life of the swingset.

SUMMARY

What is needed, is a swingset.

A swingset includes at least two support frames distributed at intervals and a connecting rod assembly configured to connect the at least two support frames. Each of the at least two support frames include at least one leg. The connecting rod assembly has a length direction and includes a first connecting rod, a second connecting rod, and a reinforcing member. The first connecting rod and the second connecting rod are arranged in sequence along the length direction. The reinforcing member overlaps a joint of the first connecting rod and the second connecting rod, and the reinforcing member is detachably connected to the first connecting rod and the second connecting rod. The reinforcing member is configured to disperse force at the joint of the first connecting rod and the second connecting rod during operation of the swingset, and weaken tension at the joint during operation of the swingset, so that the service life of the swingset is prolonged.

A swingset includes two support frames distributed at intervals and a cross rod assembly detachably connected to the support frames. The cross rod assembly includes a connecting rod assembly, the connecting rod assembly has a length direction and includes a first connecting rod, a second connecting rod, a reinforcing member, and at least one fastener. The first connecting rod and the second connecting rod are arranged in sequence along the length direction. The reinforcing member overlaps a joint of the first connecting rod and the second connecting rod, the at least one fastener detachably fixes the reinforcing member, the first connecting rod, and the second connecting rod together. In a cross-section perpendicular to the length direction, the reinforcing member overlaps at least one third of a perimeter of the first connecting rod, and the reinforcing member overlaps at least one third of a perimeter of the second connecting rod. Each of the support frames includes at least one leg, each of the at least one leg is connected to the cross rod assembly. The first connecting rod and the second connecting rod are detachably connected, which is conducive to the packaging and transportation of the swingset, and is conducive to reducing the probability of bending and deformation caused by a long length of the connecting rod during transportation. Furthermore, the reinforcing member is arranged at the joint of the first connecting rod and the second connecting rod, and the first connecting rod, the second connecting rod, and the reinforcing member are fixed by the at least one fastener, so that the joint of the first connecting rod and the second connecting rod is not easy to bending, which is beneficial to ensure the safety of the swingset and prolong the service life of the swingset.

BRIEF DESCRIPTION OF THE DRAWINGS

Implementations of the present disclosure will now be described, by way of embodiments, with reference to the attached figures.

DETAILED DESCRIPTION

Figure 1:
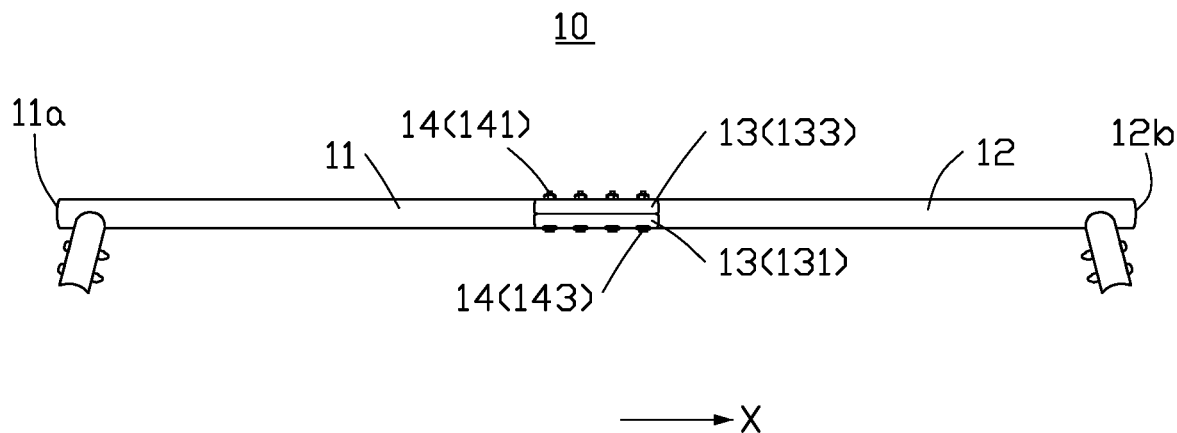
FIG. 1 is a diagram of an embodiment of a connecting rod assembly according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
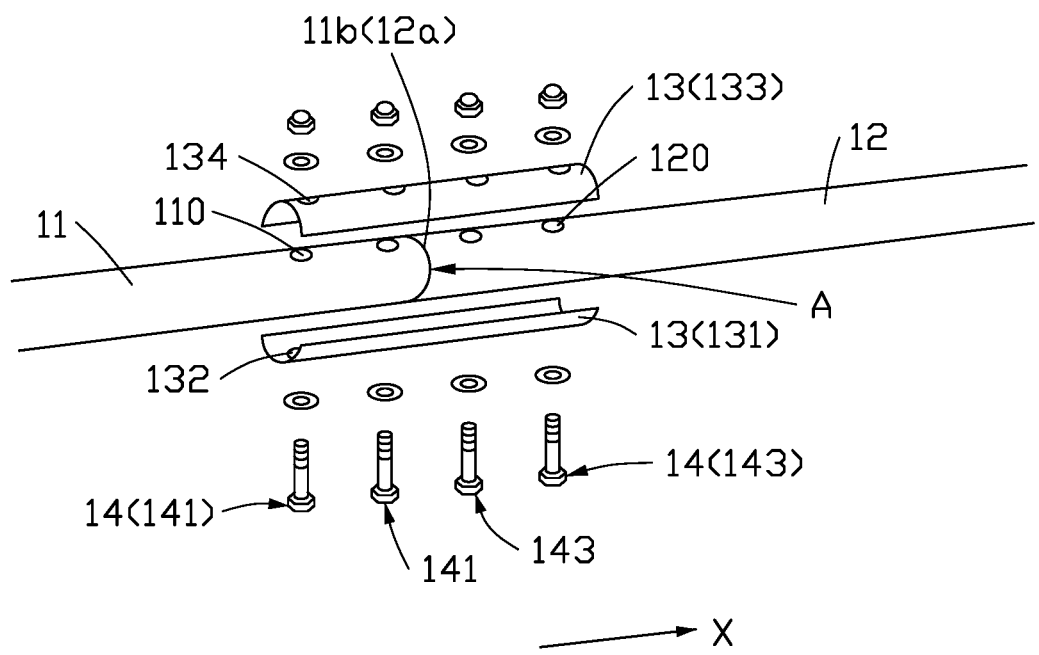
FIG. 2 is a partially exploded, diagrammatic view of an embodiment of a connecting rod assembly according to the present disclosure.

FIG. 1 and FIG. 2 illustrate an embodiment of a connecting rod assembly 10. The connecting rod assembly 10 is applicable in a piece of playground equipment, for example, in a swingset. The connecting rod assembly 10 includes a first connecting rod 11 and a second connecting rod 12 arranged in sequence along a length direction X of the connecting rod assembly 10. The connecting rod assembly 10 further includes a reinforcing member 13 and at least one fastener 14. The reinforcing member 13 is overlaped at a joint A of the first connecting rod 11 and the second connecting rod 12. The at least one fastener 14 detachably fixes the reinforcing member 13, the first connecting rod 11, and the second connecting rod 12. The first connecting rod 11 and the second connecting rod 12 are detachably connected, which can reduce the volume of whole assembly at packing for advantageous product packing and shipping and cost reduction for clearing export customs, and can reduce the probability of bending and deformation caused by a long length of the connecting rod during transportation. Furthermore, the reinforcing member 13 is arranged at the joint A of the first connecting rod 11 and the second connecting rod 12. Then the first connecting rod 11, the second connecting rod 12, and the reinforcing member 13 are fixed by the at least one fastener 14, so that the joint A of the first connecting rod 11 and the second connecting rod 12 is not easy to be bent, which is beneficial to ensure the safety of the product and prolong the service life of the product.

For example, when the connecting rod assembly 10 is applicable in a swingset, the first connecting rod 11 and the second connecting rod 12 are assembled into a cross rod assembly of the swingset. The reinforcing member 13 is arranged at the joint A of the first connecting rod 11 and the second connecting rod 12. Then, the reinforcing member 13, the first connecting rod 11, and the second connecting rod 12 are detachably fixed by the at least one fastener 14. So that the stability and the bearing capacity of the cross rod assembly of the swingset can be enhanced. For example, when an attachment (e.g., a swing, or a climbing strap) is suspended on the cross rod assembly, the force at the joint A can be dispersed by the reinforcing member 13, so that the joint A is not easily bent or even broken. For another example, a first swing is suspended on one side of the joint A of the cross rod assembly and a second swing is suspended on the other side of the joint A, and the first swing swings forward along a direction perpendicular to the length direction X and the second swing swings backward along a direction perpendicular to the length direction X. On the one hand, the force at the joint A can be dispersed by the reinforcing member 13, and on the other hand, a tension at the joint A can be weakened by the reinforcing member 13. So that the swingset does not easily to shake or even bent, or even broken. As a result, the service life of the swingset is prolonged.

In at least one embodiment, the tension at the joint A includes at least one of a first tension, a second tension, and a third tension. The first tension is generated between the first connecting rod 11 and the second connecting rod 12. The second tension is generated between the first connecting rod 11 and the reinforcing member 13. and the third tension is generated between the second connecting rod 12 and the reinforcing member 13.

In at least one embodiment, the first connecting rod 11 may be in a shape of a hollow tube and includes a first end 11a and a second end 11b facing away from the first end 11a. The second connecting rod 12 may be in a shape of a hollow tube and includes a first end 12a and a second end 12b facing away from the first end 12a. The second end 11b of the first connecting rod 11 is connected to the first end 12a of the second connecting rod 12 to form the joint A. When a shape of the first connecting rod 11 is the same as a shape of the second connecting rod 12, and a size of the first connecting rod 11 is the same as a size of the second connecting rod 12, an end surface of the second end 11b of the first connecting rod 11 and an end surface of the first end 12a of the second connecting rod 12 are aligned and connected. The end surface of the second end 11b of the first connecting rod 11 and the end surface of the first end 12a of the second connecting rod 12 may be in complete contact at the joint A, or a little gap may be existed at the joint A. It should be noted that, in actual use, the smaller the gap, the better, and the smaller the gap, the stronger the stability of the connecting rod assembly.

When the shape and the size of the first connecting rod 11 are different from the shape and the size of the second connecting rod 12, the second end 11b of the first connecting rod 11 and the first end 12a of the second connecting rod 12 are sleeved, and the joint A includes an overlapping area of the first connecting rod 11 and the second connecting rod 12. For example, if the second end 11b of the first connecting rod 11 is sleeved on the first end 12a of the second connecting rod 12, and the first end 12a of the second connecting rod 12 is received in the first connecting rod 11. The reinforcing member 13 is overlaped at the second end 11b of the first connecting rod 11. Correspondingly, if the first end 12a of the second connecting rod 12 is sleeved on the second end 11b of the first connecting rod 11, and the second end 11b of the first connecting rod 11 is received in the second connecting rod 12. The reinforcing member 13 is overlapped at the first end 12a of the second connecting rod 12.

In at least one embodiment, the first connecting rod 11 may be cylindrical, the second connecting rod 12 may be cylindrical, and a diameter of the end surface of the first connecting rod 11 may be the same as a diameter of the end surface of the second connecting rod 12. In at least one embodiment, the first connecting rod 11 and the second connecting rod 12 may also have other shapes, such as but not limited to elliptical cylinders and rectangular parallelepipeds. The size of the end surface of the first connecting rod 11 and the size of the end surface of the second connecting rod 12 may be the same or may be different. Preferably, the shape of the first connecting rod 11 is consistent with the shape of the second connecting rod 12, the size of the first connecting rod 11 is consistent with the size of the second connecting rod 12. In the present disclosure, the following description will be given by taking the end surface of the cylindrical first connecting rod 11 and the end surface of the cylindrical second connecting rod 12 having the same size as an example.

Preferably, in at least one embodiment, the first connecting rod 11 may be arched, the second connecting rod 12 may also be arched. When both of the first connecting rod 11 and the second connecting rod 12 are arched, the first connecting rod 11 and the second connecting rod 12 protrude toward the same side.

In at least one embodiment, referring to FIGS. 1 and 2, the reinforcing member 13 includes two reinforcing sheets, which are a first reinforcing sheet 131 and a second reinforcing sheet 133 respectively. Wherein, the first reinforcing sheet 131 is an arc-shaped sheet, and the second reinforcing sheet 133 is an arc-shaped sheet.

The first reinforcing sheet 131 is in contact with (e.g., attached to) an outer surface of the first connecting rod 11 and an outer surface of the second connecting rod 12, the second reinforcing sheet 133 is attached to the outer surface of the first connecting rod 11 and the outer surface of the second connecting rod 12. The first reinforcing sheet 131 and the second reinforcing sheet 133 are arranged opposite to each other. For example, when the connecting rod assembly 10 is applicable in a swingset, the first connecting rod 11 and the second connecting rod 12 are assembled into a cross rod assembly of the swingset. In practical use the first reinforcing sheet 131 is mounted on a bottom surface of the cross rod assembly, and the second reinforcing sheet 133 is mounted on a top surface of the cross rod assembly. Or the first reinforcing sheet 131 is mounted on a top surface of the cross rod assembly, and the second reinforcing sheet 133 is mounted on a bottom surface of the cross rod assembly.

The first reinforcing sheet 131, the first connecting rod 11, and the second connecting rod 12 may have the same contour. Therefore, the first reinforcing sheet 131 is sized and shaped to overlap at least part of correspondingly shaped first connecting rod 11 and at least part of correspondingly shaped second connecting rod 12.

The second reinforcing sheet 133, the first connecting rod 11, and the second connecting rod 12 may have the same contour. Therefore, the second reinforcing sheet 133 is sized and shaped to overlap at least part of correspondingly shaped first connecting rod 11 and at least part of correspondingly shaped second connecting rod 12.

It can be understood that when the first connecting rod 11 and the second connecting rod 12 are in many other kinds of sizes and shapes, a shape and size of the first reinforcing sheet 131 and a shape and size of the second reinforcing sheet 133 also change accordingly.

In at least one embodiment, the at least one fastener 14 may include a plurality of bolts, which are at least one first bolt 141 and at least one second bolt 143. Correspondingly, at least a pair of first mounting holes 110 are oppositely arranged on the first connecting rod 11, at least a pair of second mounting holes 120 are oppositely arranged on the second connecting rod 12, at least two third mounting holes 132 are arranged on the first reinforcing sheet 131, and at least two fourth mounting holes 134 are arranged on the second reinforcing sheet 133. Each first bolt 141 extends through one of the third mounting holes 132, two opposite first mounting holes 110, and one of the fourth mounting holes 134 in sequence, and fixes and locks the first reinforcing sheet 131, the first connecting rod 11, and the second reinforcing sheet 133 together. Each second bolt 143 extends through one of the third mounting holes 132, two opposite second mounting holes 120, and one of the fourth mounting holes 134 in sequence, and fixes and locks the first reinforcing sheet 131, the second connecting rod 12, and the second reinforcing sheet 133 together. Specifically, in at least one embodiment, the number of the first bolts 141 is two, the number of the second bolts 143 is two, the numbers of the first mounting holes 110, the second mounting holes 120, the third mounting holes 132, and the fourth mounting holes 134 are vary accordingly. In at least one embodiment, the first reinforcing sheet 131 and the second reinforcing sheet 133 are arranged oppositely at the joint A. Two first bolts 141 and two second bolts 143 are arranged in sequence along the length direction X, so that the connecting rod assembly 10 is not easily to be bent at the joint A after being stressed.

The connecting rod assembly 10 may further include a connecting member, at least one of the first connecting rod 11 and the second connecting rod 12 is sleeved on the connecting member. That is, the connecting member is received in at least one of the first connecting rod 11 and the second connecting rod 12, so that when the connecting rod assembly 10 is stressed, the connecting member can disperse force at the joint A of the first connecting rod 11 and the second connecting rod 12, thereby preventing the joint A of the first connecting rod 11 and the second connecting rod 12 from being easily deformed, bent or broken. On the other hand, when the connecting rod assembly 10 is applicable in a swingset, during the operation of the swingset, a lateral tension generated by the swingset can be weakened, thereby preventing the swingset from easily shaking. In at least one embodiment, the connecting member may be a reinforcing member. Preferably, along the length direction X, a length of the reinforcing member 13 is greater than or equal to a distribution length of mounting holes on the connecting member. In at least one embodiment, the length of the reinforcing member 13 may be greater than or equal to a length of the connecting member.

Figure 3A:
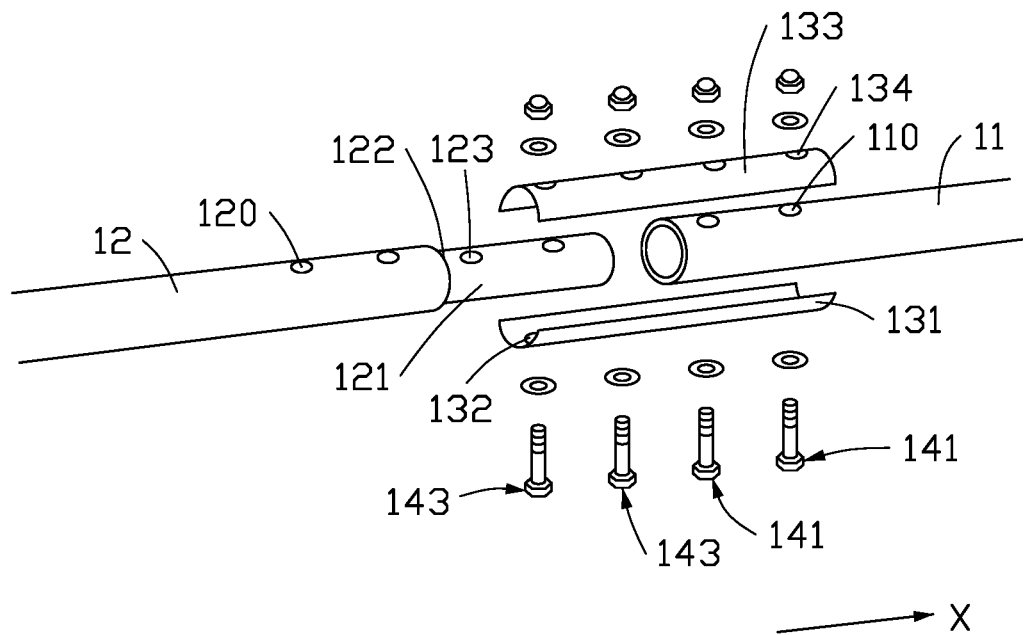
FIG. 3A is a partially exploded, diagrammatic view of an embodiment of a connecting rod assembly according to the present disclosure.

In at least one embodiment, referring to FIG. 3A, the connecting member includes an extension portion 121 extending along the length direction X from one end of the second connecting rod 12. In one embodiment, the extension portion 121 and the second connecting rod 12 are integrally formed. A cross section of the extension portion 121 perpendicular to the length direction X is less than a cross section of the second connecting rod 12 perpendicular to the length direction X, that is, a stepped surface 122 is formed at a joint of the extension portion 121 and the second connecting rod 12. The first connecting rod 11 is in a shape of a hollow tube and is sleeved on the extension portion 121. And the first connecting rod 11 may abut against the stepped surface 122. Then, at least a pair of fifth mounting holes 123 are oppositely arranged on the extension portion 121, and the first bolt 141 further extends through two opposite fifth mounting holes 123. In at least one embodiment, the second bolts 143 and the second mounting holes 120 may be omitted, the first connecting rod 11 and the second connecting rod 12 are fixed together by the first bolt 141 extending through the third mounting hole 132, the first mounting holes 110, the fifth mounting holes 123, and the fourth mounting holes 134.

Along the length direction X, a length of the first reinforcing member 131 is greater than a distribution length of the fifth mounting holes 123 on the extension portion 121, and a length of the second reinforcing member 133 is greater than the distribution length of the fifth mounting holes 123 on the extension portion 121. So that the structural stability of the connecting rod assembly 10 is enhanced.

In at least one embodiment, along the length direction X, the length of the first reinforcing member 131 can be equal to the distribution length of the fifth mounting holes 123 on the extension portion 121, and the length of the second reinforcing member 133 can be equal to the distribution length of the fifth mounting holes 123 on the extension portion 121.

In at least one embodiment, along the length direction X, the length of the first reinforcing sheet 131 is greater than or equal to the length of the extension portion 121, the length of the second reinforcing sheet 133 is greater than or equal to the length of the extension portion 121. Preferably, along the length direction X, the length of the first reinforcing sheet 131 is twice the length of the extension portion 121, the length of the second reinforcing sheet 133 is twice the length of the extension portion 121. Half length of the first reinforcing sheet 131 overlaps the extension portion 121, and the other half length of the first reinforcing sheet 131 overlaps the second connecting rod 12. Half length of the second reinforcing sheet 133 overlaps the extension portion 121, and the other half length of the second reinforcing sheet 133 overlaps the second connecting rod 12. So that the structural stability of the connecting rod assembly 10 is further enhanced.

Figure 3B:
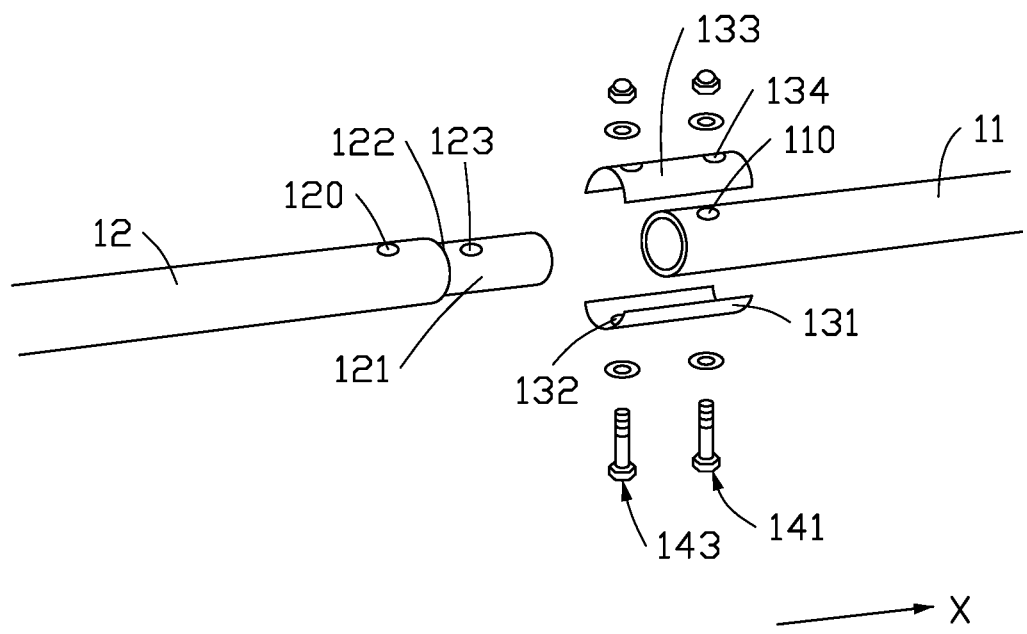
FIG. 3B is a partially exploded, diagrammatic view of an embodiment of a connecting rod assembly according to the present disclosure.

FIG. 3B shows a connecting rod assembly different from the connecting rod assembly of the embodiment shown in FIG. 3A. Referring to FIG. 3B, the connecting rod assembly includes a first bolt 141 and a second bolt 143. Specifically, the first bolt 141 and the second bolt 143 are arranged at intervals along the length direction X. The first bolt 141 extends through one third mounting hole 132, one of the first mounting holes 110, two opposite fifth mounting holes 123, the other of the first mounting holes 110, and one fourth mounting hole 134 in sequence. The second bolt 143 extends through one third mounting hole 132, two opposite second mounting holes 120, and one fourth mounting hole 134 in sequence.

Figure 4:
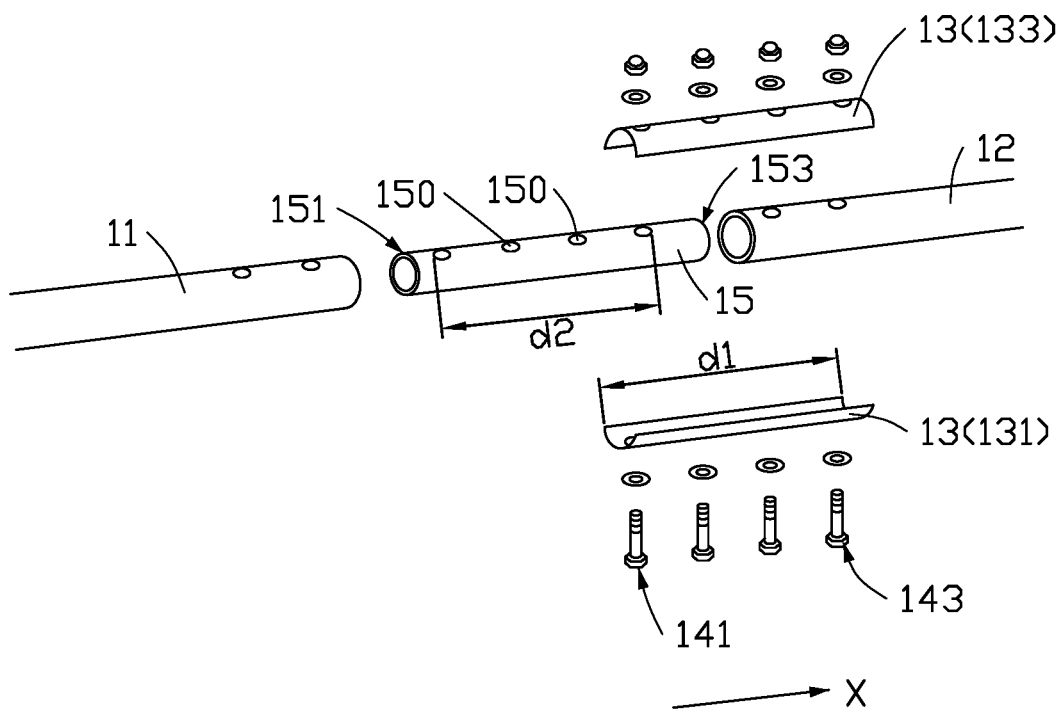
FIG. 4 is a partially exploded, diagrammatic view of an embodiment of a connecting rod assembly according to the present disclosure.

In at least one embodiment, referring to FIG. 4, the connecting member includes a connecting pillar 15. The connecting pillar 15 includes a first end 151 and a second end 153 facing away from the first end 151. The first connecting rod 11 and the second connecting rod 12 are respectively in a shape of a hollow tube. Wherein, the first connecting rod 11 is sleeved on the connecting pillar 15 from the first end 151, and the second connecting rod 12 is sleeved on the connecting pillar 15 from the second end 153. The connecting pillar 15 is received in the first connecting rod 11 and the second connecting rod 12. And the first connecting rod 11 and the second connecting rod 12 may abut against with each other. Then, at least two pairs of sixth mounting holes 150 are arranged on the connecting pillar 15. The first bolt 141 further extends through one pair of the sixth mounting holes 150, the second bolt 143 further extends through the other pair of the sixth mounting holes 150.

Along the length direction X, the length of the first reinforcing sheet 131 is greater than or equal to a length of the connecting pillar 15, the length of the second reinforcing sheet 133 is greater than or equal to a length of the connecting pillar 15. So that the structural stability of the connecting rod assembly 10 is enhanced. Preferably, along the length direction X, the length of the first reinforcing sheet 131 is equal to the length of the connecting pillar 15, and opposite ends of the first reinforcing sheet 131 are flush with opposite ends of the connecting pillar 15. For example, the first reinforcing sheet 131 includes a first end and a second end facing away from the first end. The connecting pillar 15 includes a first end and a second end facing away from the first end. The first end of the first reinforcing sheet 131 is flush with the first end of the connecting pillar 15, and the second end of the first reinforcing sheet 131 is flush with the second end of the connecting pillar 15. Along the length direction X, the length of the second reinforcing sheet 133 is equal to the length of the connecting pillar 15, and opposite ends of the second reinforcing sheet 133 are flush with opposite ends of the connecting pillar 15. For example, the second reinforcing sheet 133 includes a third end and a fourth end facing away from the third end. The third end of the second reinforcing sheet 133 is flush with the first end of the connecting pillar 15, and the fourth end of the second reinforcing sheet 133 is flush with the second end of the connecting pillar 15. So that the structural stability of the connecting rod assembly 10 is improved.

It can be understood that, in at least one embodiment, the length of the first reinforcing sheet 131 or the length of the second reinforcing sheet 133 may be slightly less than the length of the connecting pillar 15. Along the length direction X, the length of the first reinforcing sheet 131 is greater than or equal to a distribution length of sixth mounting holes 150 on the connecting pillar 15, and the length of the second reinforcing sheet 133 is greater than or equal to a distribution length of sixth mounting holes 150 on the connecting pillar 15. For example, referring to FIG. 4, the length d1 of the first reinforcing sheet 131 is greater than or equal to the distribution length d2 of sixth mounting holes 150 on the connecting pillar 15, then d1≥ d2.

Figure 5:
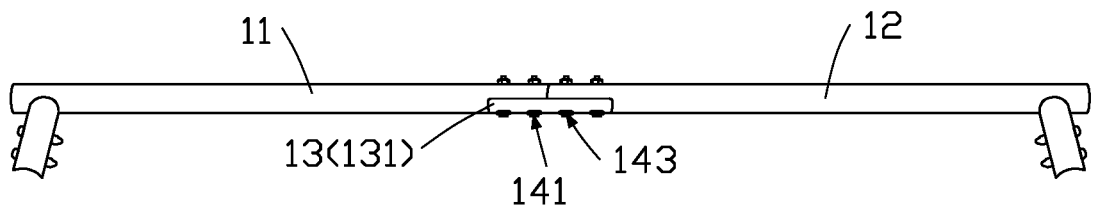
FIG. 5 is a diagram of an embodiment of a connecting rod assembly according to the present disclosure.

In at least one embodiment, referring to FIGS. 2 and 5, the second reinforcing sheet 133 may be omitted, only the first reinforcing sheet 131 is attached to the outer surface of the first connecting rod 11 and the outer surface of the second connecting rod 12, each first bolt 141 extends through the first mounting holes 110 and the third mounting hole 132 to fix and lock the first connecting rod 11 and the first reinforcing sheet 131 together, and each second bolt 143 extends through the second mounting holes 120 and another third mounting hole 132 to fix and lock the second connecting rod 12 and the first reinforcing sheet 131 together, thereby realizing a purpose of fixing and locking the first connecting rod 11 and the second connecting rod 12. And the first connecting rod 11 may abut with the second connecting rod 12.

Figure 6:
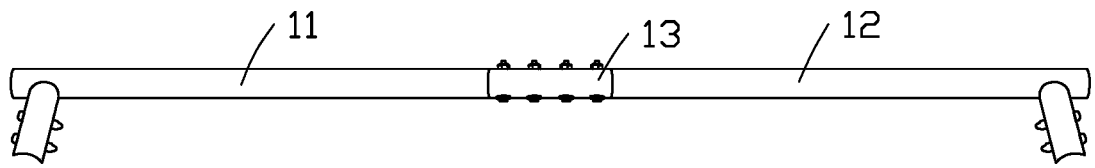
FIG. 6 is a diagram of an embodiment of a connecting rod assembly according to the present disclosure.
Figure 7A:
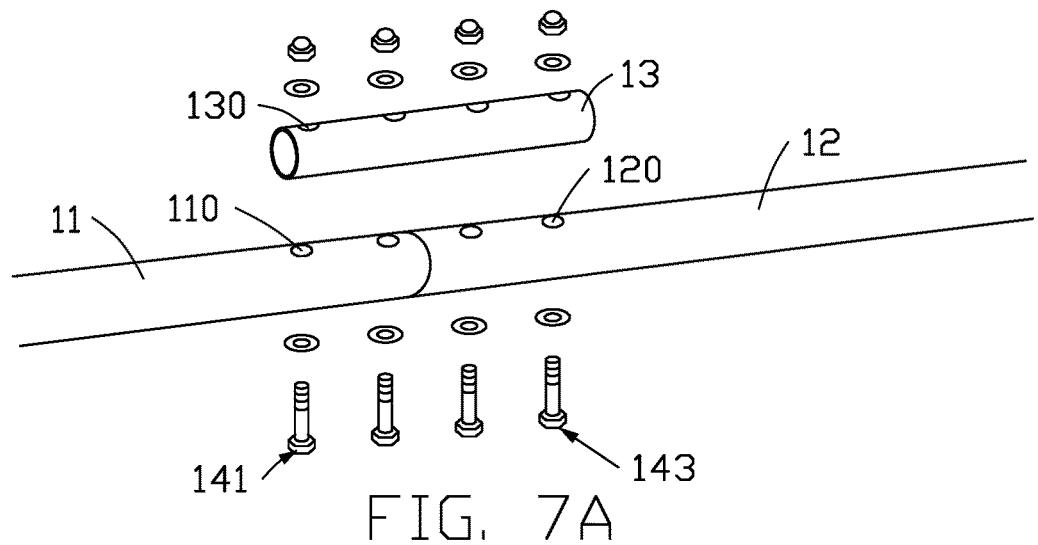
FIG. 7A is a partially exploded, diagrammatic view of an embodiment of a connecting rod assembly according to the present disclosure.

In at least one embodiment, referring to FIGS. 6 and 7A, the reinforcing member 13 may include a sleeve, and the sleeve is sleeved on the outer surface of the first connecting rod 11 and the outer surface of the second connecting rod 12. The second end 11b of the first connecting rod 11 and the first end 12a of the second connecting rod 12 are received in the sleeve. At least two pairs of seventh mounting holes 130 are oppositely arranged on the sleeve. Wherein, each first bolt 141 extends through two opposite seventh mounting holes 130 and two opposite first mounting holes 110, so the first connecting rod 11 and the sleeve are fixed and locked together. Each second bolt 143 extends through another two opposite seventh mounting holes 130 and two opposite second mounting holes 120, and the second connecting rod 12 and the sleeve are fixed and locked together. And the first connecting rod 11 may abut against the second connecting rod 12.

Figure 7B:
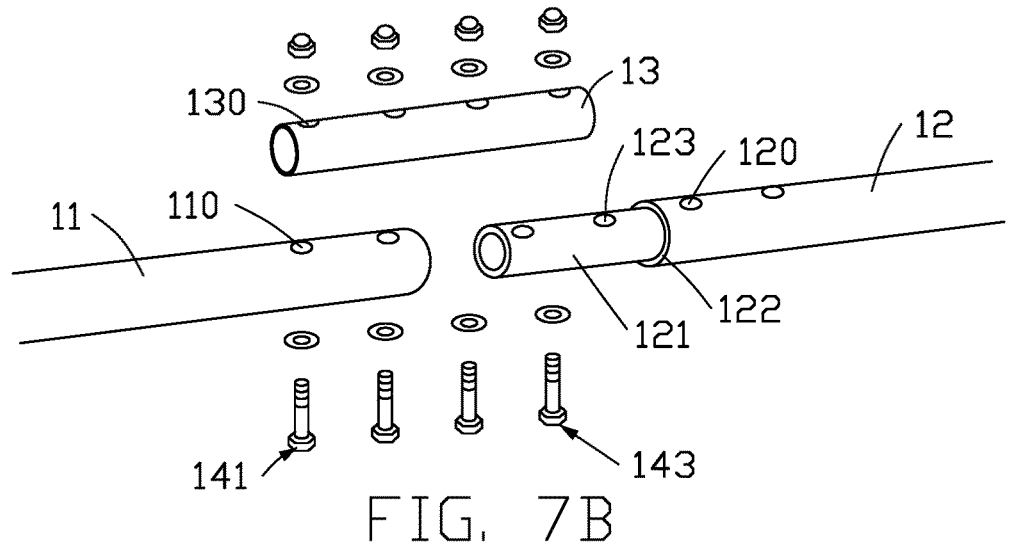
FIG. 7B is a partially exploded, diagrammatic view of an embodiment of a connecting rod assembly according to the present disclosure.

FIG. 7B shows a connecting rod assembly different from the connecting rod assembly of the embodiment shown in FIG. 7A. Referring to FIG. 7B, the connecting rod assembly further includes a connecting member, the connecting member includes an extension portion 121 extending along the length direction X from one end of the second connecting rod 12. In one embodiment, the extension portion 121 and the second connecting rod 12 are integrally formed. A cross section of the extension portion 121 perpendicular to the length direction X is less than a cross section of the second connecting rod 12 perpendicular to the length direction X, that is, a stepped surface 122 is formed at a joint of the extension portion 121 and the second connecting rod 12. The first connecting rod 11 is in a shape of a hollow tube and is sleeved on the extension portion 121. And the first connecting rod 11 may abut against the stepped surface 122. Then, at least a pair of fifth mounting holes 123 are oppositely arranged on the extension portion 121, and the first bolt 141 further extends through two opposite fifth mounting holes 123. In at least one embodiment, the second bolts 143 and the second mounting holes 120 may be omitted, the first connecting rod 11 and the second connecting rod 12 are fixed together by the first bolt 141 extending through two opposite seventh mounting holes 130, two opposite first mounting holes 110, and the fifth mounting holes 123.

Along the length direction X, a length of the reinforcing member 13 is greater than a distribution length of the fifth mounting holes 123 on the extension portion 121. So that the structural stability of the connecting rod assembly 10 is enhanced.

In at least one embodiment, along the length direction X, the length of the reinforcing member 13 can be equal to the distribution length of the fifth mounting holes 123 on the extension portion 121.

In at least one embodiment, along the length direction X, the length of the reinforcing member 13 is greater than or equal to the length of the extension portion 121. Preferably, along the length direction X, the length of the reinforcing member 13 is twice the length of the extension portion 121. Half length of the reinforcing member 13 overlaps the extension portion 121, and the other half length of the reinforcing member 13 overlaps the second connecting rod 12. So that the structural stability of the connecting rod assembly 10 is further enhanced. In at least one embodiment, along the length direction X, the length of the reinforcing member 13 is greater than or equal to a distribution length of the fifth mounting holes 123 of the extension portion 121 as shown in FIG. 7B.

Figure 7C:
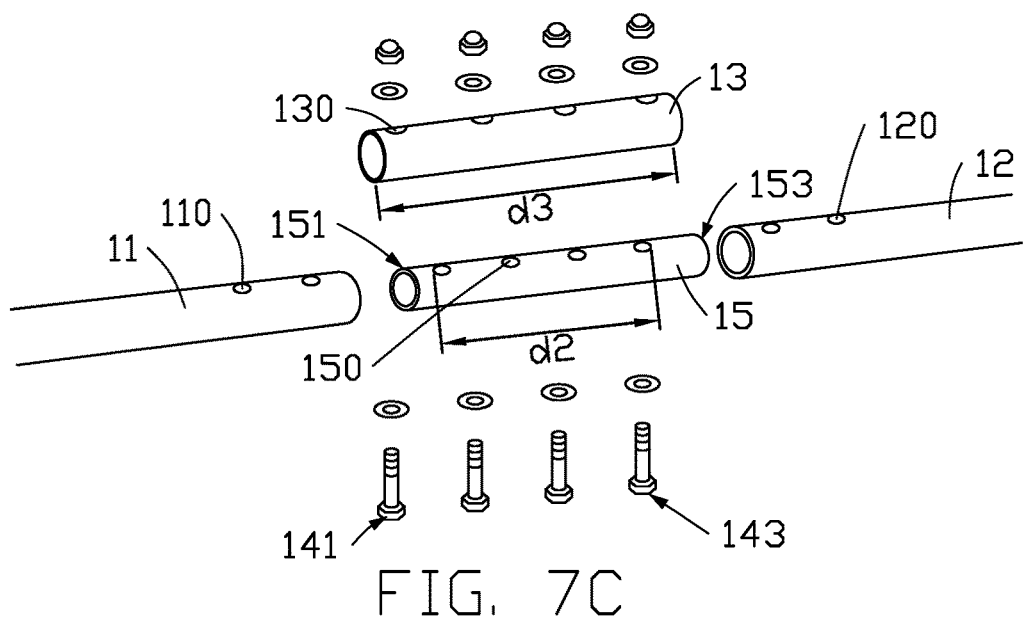
FIG. 7C is a partially exploded, diagrammatic view of an embodiment of a connecting rod assembly according to the present disclosure.

FIG. 7C shows a connecting rod assembly different from the connecting rod assembly of the embodiment shown in FIG. 7B. Referring to FIG. 7C, the connecting member includes a connecting pillar 15. The connecting pillar 15 includes a first end 151 and a second end 153 facing away from the first end 151. The first connecting rod 11 and the second connecting rod 12 are respectively in a shape of a hollow tube. Wherein, the first connecting rod 11 is sleeved on the connecting pillar 15 from the first end 151, and the second connecting rod 12 is sleeved on the connecting pillar 15 from the second end 153. The connecting pillar 15 is received in the first connecting rod 11 and the second connecting rod 12. And the first connecting rod 11 and second connecting rod 12 may abut against with each other. Then, at least two pairs of sixth mounting holes 150 are arranged on the connecting pillar 15. The first bolt 141 further extends through one pair of the sixth mounting holes 150, the second bolt 143 further extends through the other pair of the sixth mounting holes 150.

Along the length direction X, the length of the reinforcing member 13 is greater than or equal to a length of the connecting pillar 15. So that the structural stability of the connecting rod assembly 10 is enhanced. Preferably, along the length direction X, the length of the reinforcing member 13 is equal to the length of the connecting pillar 15, and opposite ends of the reinforcing member 13 are flush with opposite ends of the connecting pillar 15. For example, the reinforcing member 13 includes a first end and a second end facing away from the first end. The connecting pillar 15 includes a first end and a second end facing away from the first end. The first end of the reinforcing member 13 is flush with the first end of the connecting pillar 15, and the second end of the reinforcing member 13 is flush with the second end of the connecting pillar 15. So that the structural stability of the connecting rod assembly 10 is improved.

It can be understood that, in at least one embodiment, the length of the reinforcing member 13 may be slightly less than the length of the connecting pillar 15. Along the length direction X, the length of the reinforcing member 13 is greater than or equal to a distribution length of sixth mounting holes 150 on the connecting pillar 15. For example, referring to IFG. 7C, the length d3 of the reinforcing member 13 is greater than or equal to the distribution length d2 of sixth mounting holes 150 on the connecting pillar 15, then d3⩾ d2.

Figure 8:
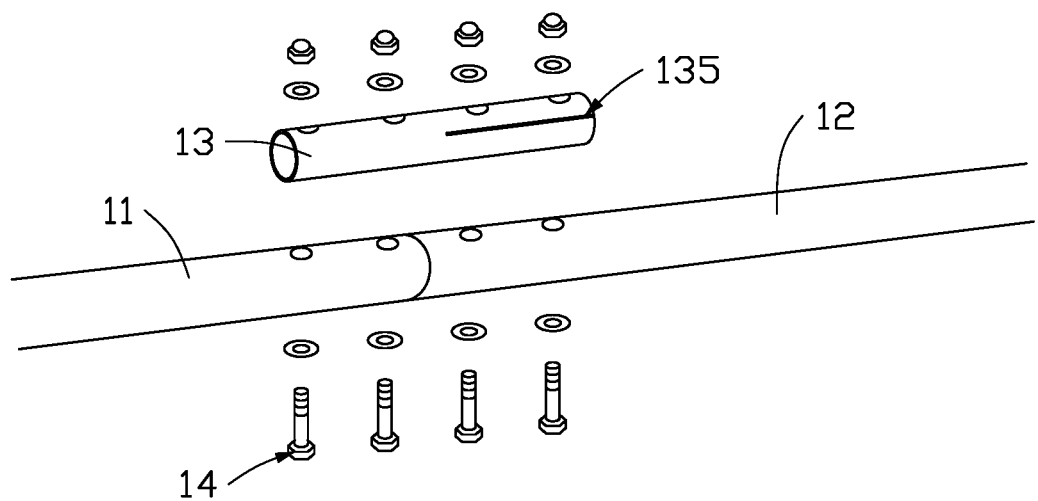
FIG. 8 is a partially exploded, diagrammatic view of an embodiment of a connecting rod assembly according to the present disclosure.
Figure 9:
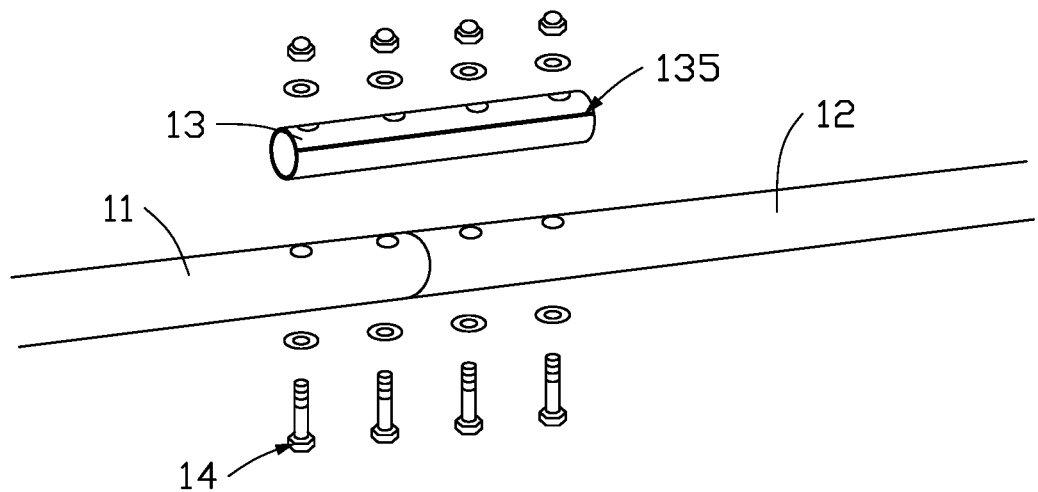
FIG. 9 is a partially exploded, diagrammatic view of an embodiment of a connecting rod assembly according to the present disclosure.
Figure 10:
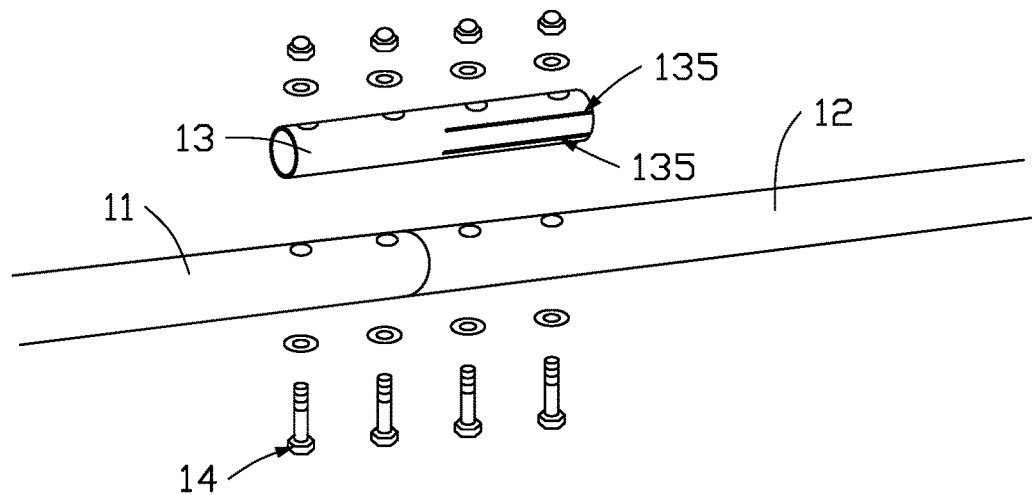
FIG. 10 is a partially exploded, diagrammatic view of an embodiment of a connecting rod assembly according to the present disclosure.
Figure 11A:
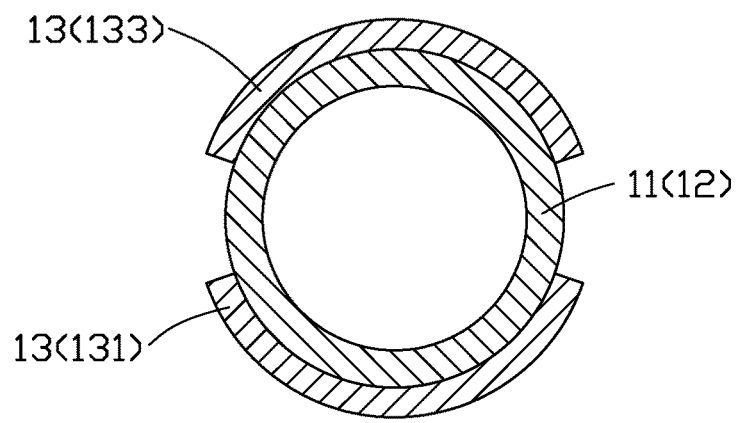
FIG. 11A is a cross-sectional view of an embodiment of a connecting rod assembly according to the present disclosure.
Figure 11B:
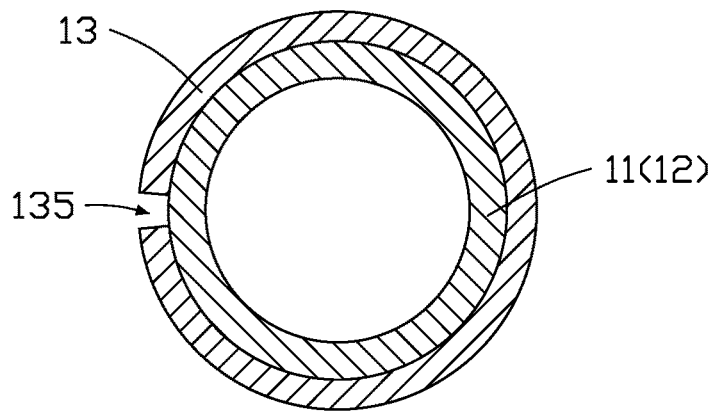
FIG. 11B is a cross-sectional view of an embodiment of a connecting rod assembly according to the present disclosure.

In at least one embodiment, referring to FIGS. 8 and 11B, the sleeve as the reinforcing member 13 may include a slit 135. The sleeve further includes two opposite ends, an inner surface, and an outer surface facing away from the inner surface. The slit 135 extends from one of the ends of the sleeve toward the other end, and penetrates the inner surface and the outer surface of the sleeve. Referring to FIG. 9, the slit 135 may penetrate the two opposite ends, and penetrate the inner surface and the outer surface of the sleeve. Referring to FIG. 10, when the slit 135 extends from one of the ends of the sleeve toward the other end of the sleeve, the number of the slits 135 may be multiple and multiple slits 135 may distribute at intervals.

In combination with the above-mentioned embodiments that the reinforcing member 13 may be a reinforcing sheet, two reinforcing sheet or a sleeve, in at least one embodiment, referring to FIGS. 11A and 11B, in a cross-section perpendicular to the length direction X, in an overlapping area of the reinforcing member 13 and the first connecting rod 11, the reinforcing member 13 overlaps at least one third of a perimeter of the first connecting rod 11. And in an overlapping area of the reinforcing member 13 and the second connecting rod 12, the reinforcing member 13 overlaps at least one third of a perimeter of the second connecting rod 12, so as to help improve a strength of the joint of the first connecting rod 11 and the second connecting rod 12, so that the joint is not easy to be bent, and the structure of the connecting rod assembly 10 is more stable. More preferably, in the cross-section perpendicular to the length direction X, in the overlapping area of the reinforcing member 13 and the first connecting rod 11, the reinforcing member 13 overlaps at least half of the perimeter of the first connecting rod 11, and in the overlapping area of the reinforcing member 13 and the second connecting rod 12, the reinforcing member 13 overlaps at least half of the perimeter of the second connecting rod 12. In at least one embodiment, in a cross-section of an element, a perimeter of the element refers to the perimeter of the outer surface of the element in the cross-section.

In at least one embodiment, along the length direction X, an overlapping length of the reinforcing member 13 and the first connecting rod 11 may be equal to an overlapping length of the reinforcing member 13 and the second connecting rod 12.

In at least one embodiment, the connecting rod assembly 10 may be formed by several connecting rods which are sequentially connected, and every two connecting rods are connected by the reinforcing members and fasteners.

In at least one embodiment, if the connecting rod assembly 10 includes the connecting member, the reinforcing member 13 may be omitted.

Figure 12A:
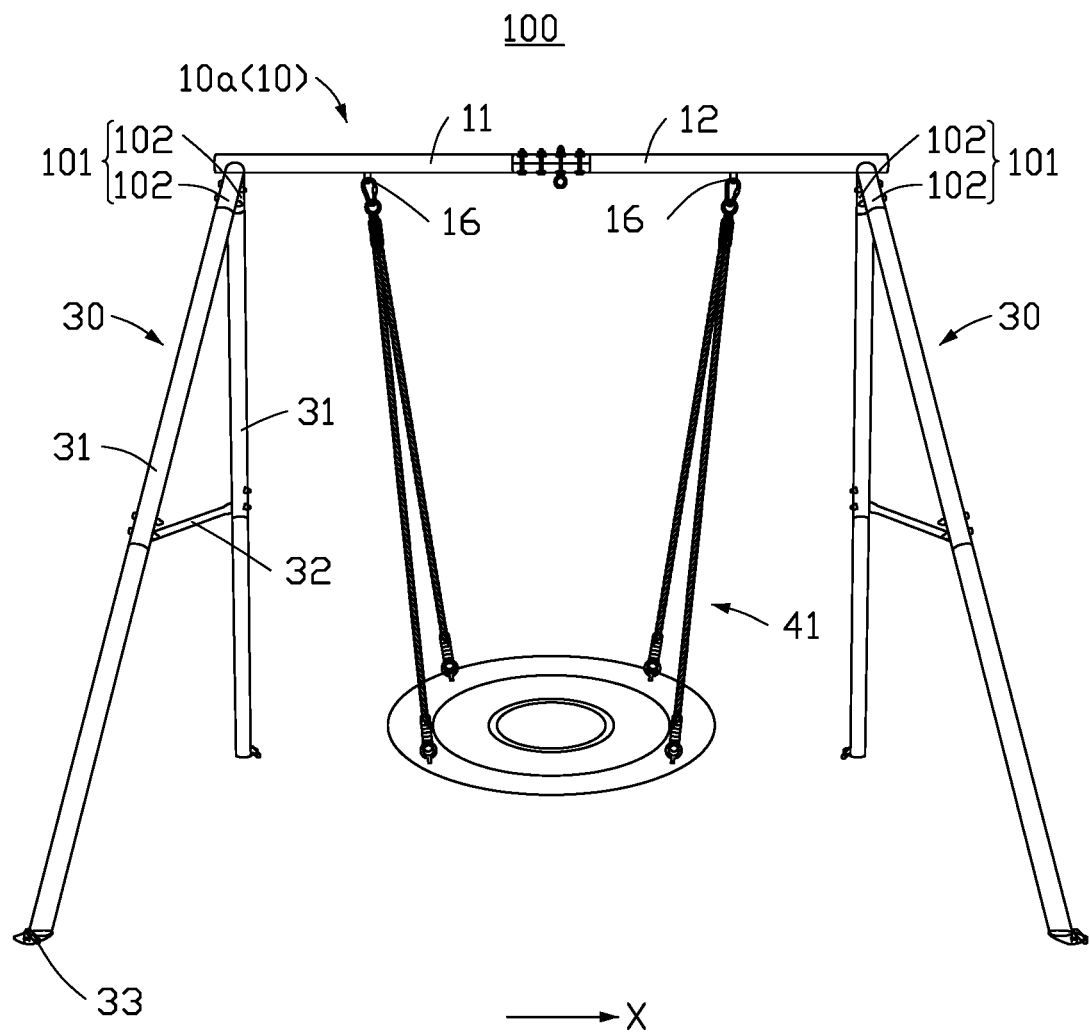
FIG. 12A is a diagram of an embodiment of a swingset according to the present disclosure.

Referring to FIG. 12A, the above-mentioned connecting rod assembly 10 may be applicable in a swingset 100. The swingset 100 includes a cross rod assembly 10a and at least two support frames 30. The at least two support frames 30 are distributed at intervals. The cross rod assembly 10a is connected between the at least two support frames 30. In the present disclosure, the number of the support frames 30 is two, and the cross rod assembly 10a is detachably connected to each of the support frames 30 as an example for the following description.

The cross rod assembly 10a includes the connecting rod assembly 10 as described above. The at least two support frames 30 are arranged at intervals along the length direction X, and the connecting rod assembly 10 connects to the at least two support frames 30. In at least one embodiment, the connecting rod assembly 10 is detachably connected to the at least two support frames 30. In some embodiment, the connecting rod assembly 10 may be directly fixedly connected to the at least two support frames 30 by welding.

Each of the at least two support frames 30 includes at least one leg 31. In this embodiment, each support frame 30 preferably include two legs 31. In at least one embodiment, the legs 31 are arranged obliquely. Each of the support frames 30 may further include a lateral support member 32, the lateral support member 32 is connected between the two legs 31. A triangular structure is formed between the two legs 31 and the lateral support member 32, so that a structure of each of the support frames 30 is stable. Each of the support frames 30 may further include a reinforcing support member 34, one end of the reinforcing support member 34 is connected to the lateral support member 32, the other end extends away from the cross rod assembly 10a. Specifically, the end of the reinforcing support member 34 away from the lateral support member 32 is used to support against the ground. The reinforcing support member 34 is used in combination with the lateral support member 32 to form the swingset 100 can prevent the swingset 100 from shaking in the length direction X, so that a structure of the swingset 100 is more stable.

Each of the legs 31 is connected to the cross rod assembly 10a. Specifically, in at least one embodiment, the cross rod assembly 10a may be provided with two leg sleeves 101 spaced from each other along the length direction X. Each of the leg sleeves 101 includes two intersecting connecting portions 102 respectively sleeved on the legs 31 of the support frame 30, so as to connect the support frame 30 and the cross rod assembly 10a. Referring to FIG. 12A, the leg sleeves 101 are disposed adjacent to opposite ends of the cross rod assembly 10a. In at least one embodiment, the leg sleeve 101 may be disposed at any position of the cross rod assembly 10a, and the number of the leg sleeves 101 is adjusted according to the number of the support frames 30.

Figure 12B:
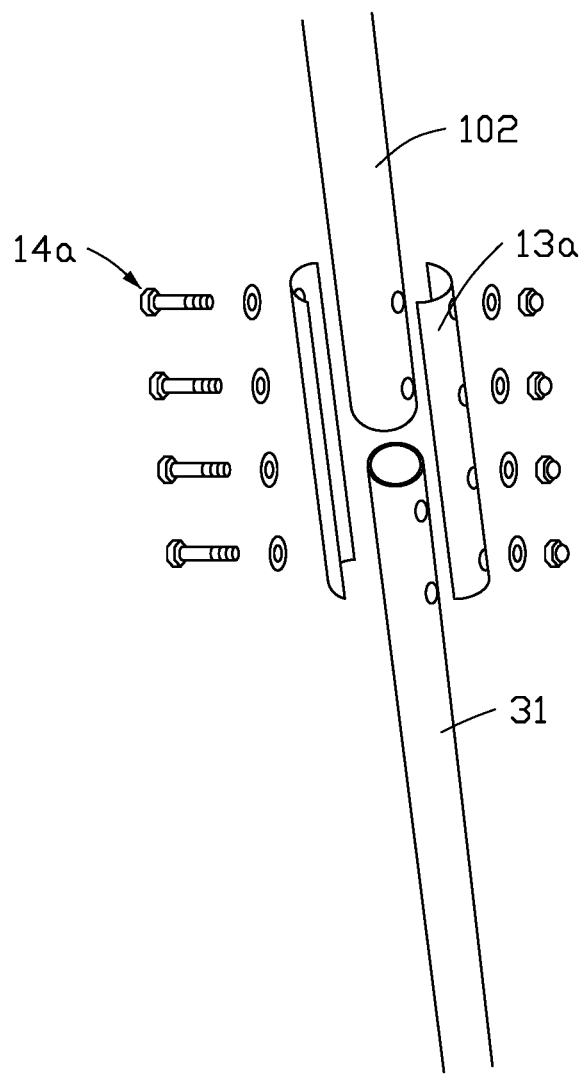
FIG. 12B is a partially diagram of an embodiment of a swingset according to the present disclosure.
Figure 12C:
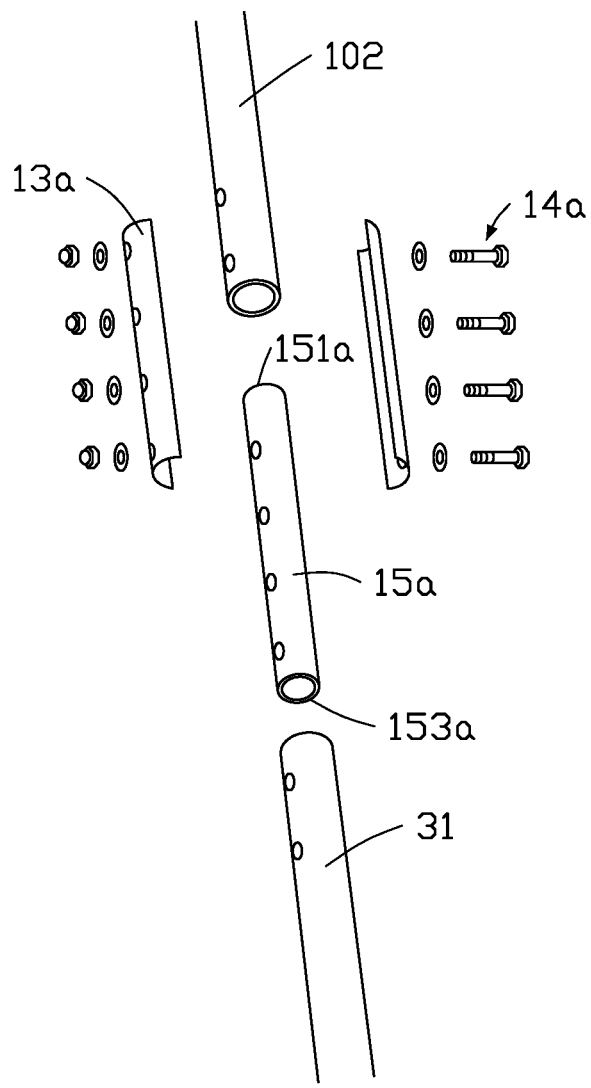
FIG. 12C is a partially diagram of an embodiment of a swingset according to the present disclosure.

In at least one embodiment, referring to FIG. 12B, the swingset 100 may further include a strengthening member 13a and a fastening member 14a. The strengthening member 13a may be disposed at a joint of the connecting portion 102 and the leg 31. In at least one embodiment, the strengthening member 13a may be disposed at an overlapping area of the connecting portion 102 and the leg 31, and the fastening member 14a detachably fixes the strengthening member 13a, the connecting portion 102, and the leg 31, thereby increasing a connection strength between the connecting portion 102 and the leg 31, which is beneficial to prevent the joint of the connecting portion 102 and the leg 31 from being bent, even prevent the connecting portion 102 or the leg 31 from being broken due to a tension generated when the swing swings along the direction perpendicular to the length direction X. So that the structure of the swingset 100 is more stable during use, and the service life of the swingset 100 is prolonged. The fastening member 14a may include at least one bolt, and the number of the bolts is not limited. Specifically, ways to connect the connecting portion 102 to the leg 31 may be the same as the ways to connect the first connecting rod 11 to the second connecting rod 12, and a fixing manner between the connecting portion 102 and the leg 31 may be the same as a fixing manner between the first connecting rod 11 and the second connecting rod 12. A structure of the strengthening member 13a may be the same as a structure of the reinforcing member 13, and a structure of the fastening member 14a may be the same as a structure of fastener 14. In at least one embodiment, referring to FIG. 12c, the swingset 100 may further include a mounting pillar 15a, the mounting pillar 15a includes a first end portion 151a and a second end portion 153a facing away from the first end portion 151a. The connecting portion 102 is sleeved on the mounting pillar 15a from the first end portion 151a. The leg 31 is a hollow tube and is sleeved on the mounting pillar 15a from the second end portion 153a. The strengthening member 13a is disposed on the connecting portion 102 and the leg 31 and corresponds to the mounting pillar 15a. For example, a length of the strengthening member 13a is equal to a length of the mounting pillar 15a. Two opposite ends of the strengthening member 13a are aligned with two opposite ends of the mounting pillar 15a. In other embodiment, the length of the strengthening member 13a may be greater than the length of the mounting pillar 15a. The fastening member 14a detachably fixes the strengthening member 13a, the connecting portion 102, the mounting pillar 15a, and the leg 31.

Figure 13:
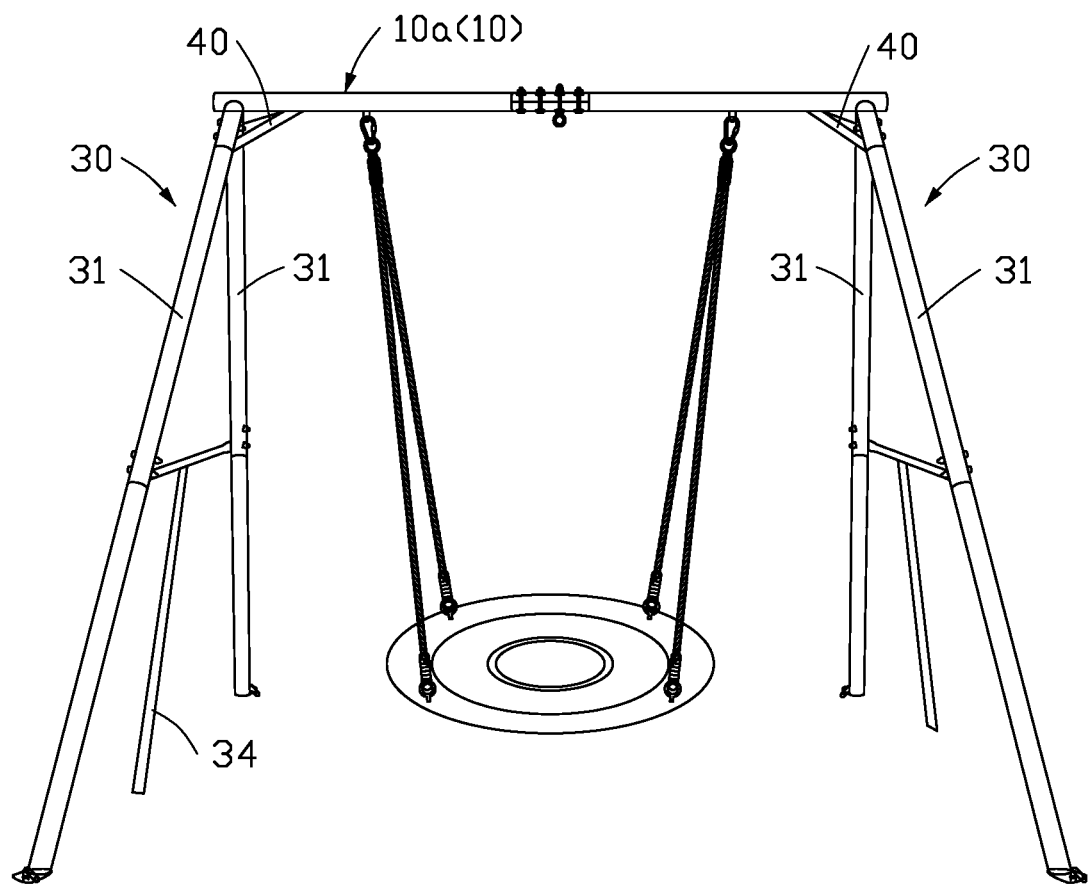
FIG. 13 is a diagram of an embodiment of a swingset according to the present disclosure.

In at least one embodiment, referring to FIG. 13, the swingset 100 may further include two strengthening support members 40. One end of each of the strengthening support members 40 is connected to the cross rod assembly 10a, the other end of each of the strengthening support members 40 is connected to one of the support frames 30. Specifically, each of the strengthening support members 40 is connected to the leg 31 of the support frames 30. A shape of the strengthening support members 40 is not limited and varied as needed.

Figure 14:
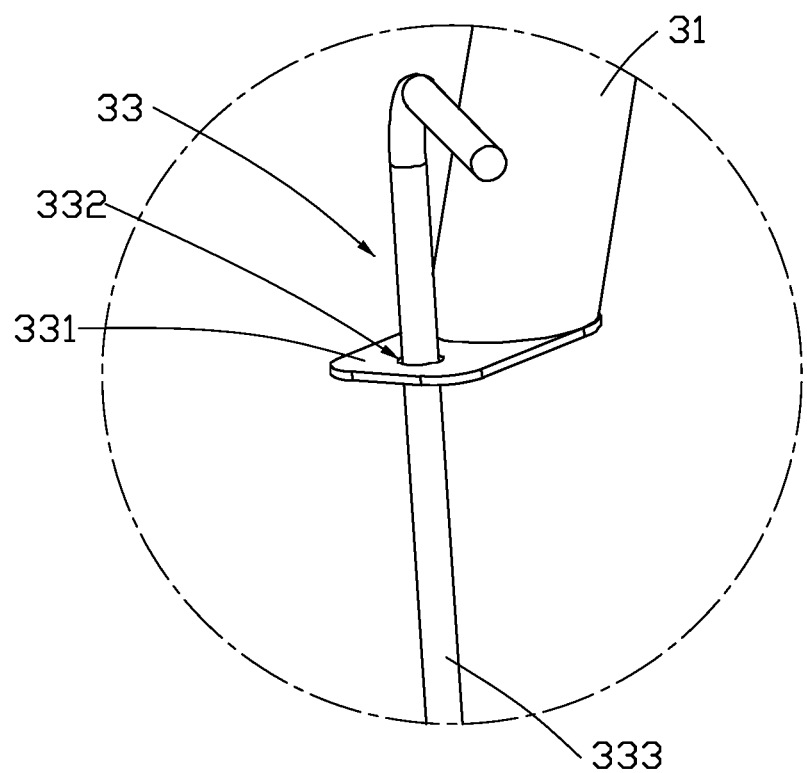
FIG. 14 is a partially diagram of an embodiment of a swingset according to the present disclosure.
Figure 15:
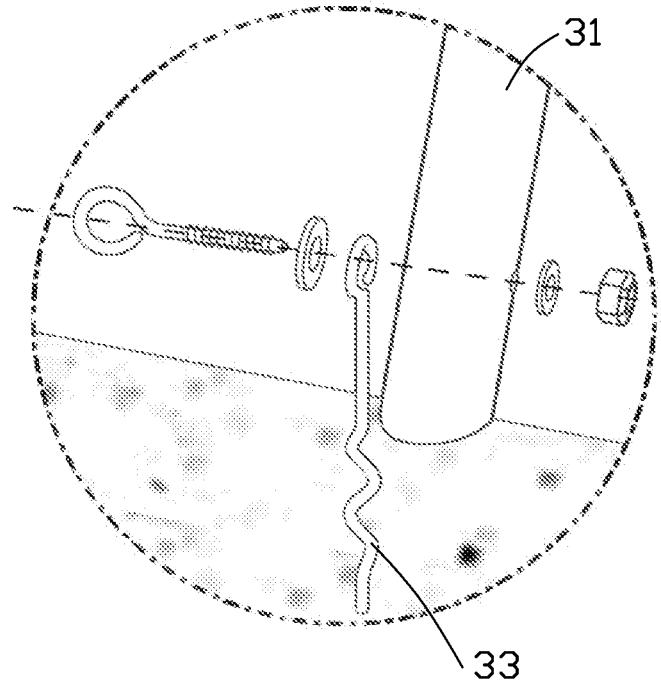
FIG. 15 is a partially diagram of an embodiment of a swingset according to the present disclosure.

Referring to FIG. 12A, an end portion of each of the legs 31 facing away from the cross rod assembly 10a may be provided with a ground gripping member 33. Specifically, in at least one embodiment, referring to FIG. 14, the ground gripping member 33 may include a ground support portion 331 and a fixing member 333. The ground support portion 331 is used to support on the ground and is substantially parallel to the cross rod assembly 10a and the fixing member 333 is matched with the ground support portion 331. The ground support portion 331 includes a connecting hole 332, the fixing member 333 movably extends through the connecting hole 332 to fix the support frame 30 to the ground. The fixing member 333 may be, but not limited to, a nail, such as an expansion screw or a ground nail. Referring to FIG. 15, one end of the ground gripping member 33 may be fixed with the leg 31, and the other end of the ground gripping member 33 is used for grasping the ground. For example, the other end of the ground gripping member 33 is inserted into the ground.

An end of the reinforcing support member 34 facing away from the lateral support member 32 may include the ground gripping member 33 too, so that the swingset 100 is more stable during use.

In at least one embodiment, the leg 31 may include the connecting rod assembly 10, so that the leg 31 can be disassembled during transportation, a risk of the leg 31 being deformed due to being too long during transportation is reduced, and the firmness of a structure of the leg 31 may be improved, thereby helping to ensure the safety of the swingset and prolong the service life of the swingset.

Figure 16:
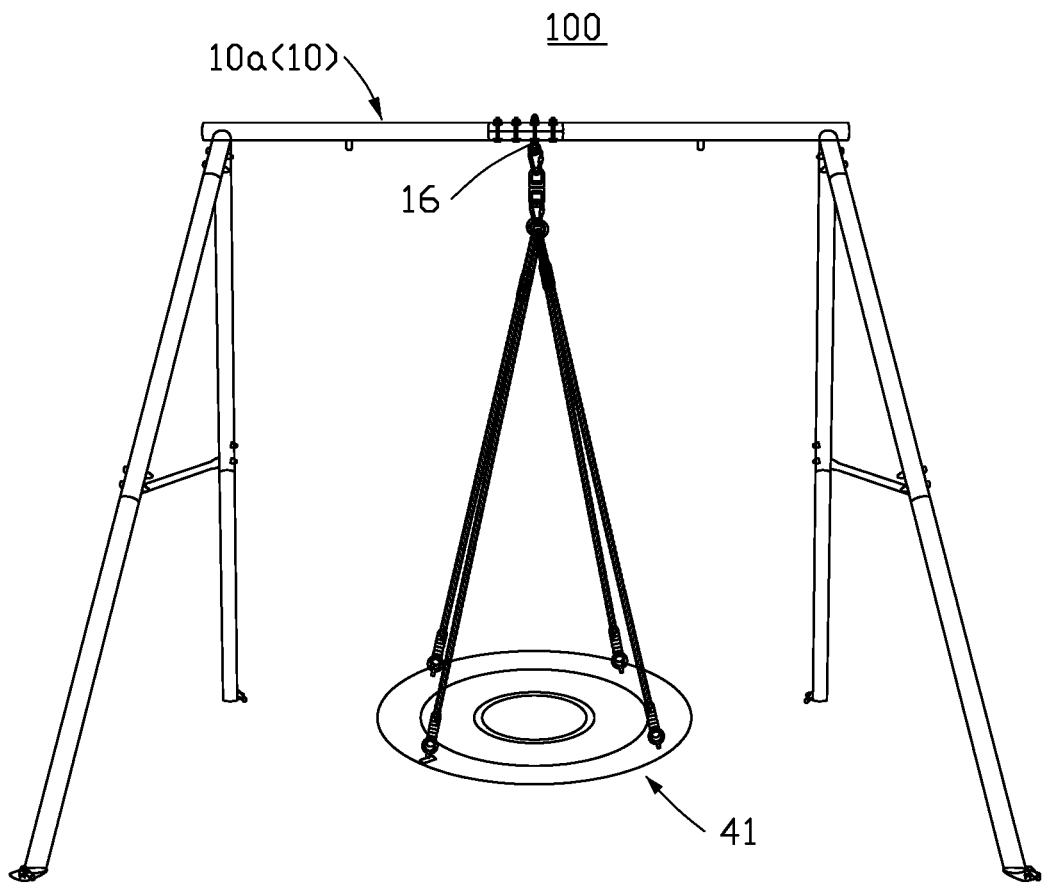
FIG. 16 is a diagram of an embodiment of a swingset according to the present disclosure.

The cross rod assembly 10a may include at least one hanger 16 (shown in FIG. 12A). The at least one hanger 16 is arranged on the first connecting rod 11 or on the second connecting rod 12 for hanging objects. The number of the hangers 16 can be varied as needed. Referring to FIGS. 12A and 16, the swingset 100 includes at least one swing 41, the swing 41 may be attached to the cross rod assembly 10a through the at least one hanger 16. In at least one embodiment, the at least one hanger 16 may be omitted, the swing 41 can be attached to the cross rod assembly 10a through a hanging rope of the swing 41.

Figure 17:
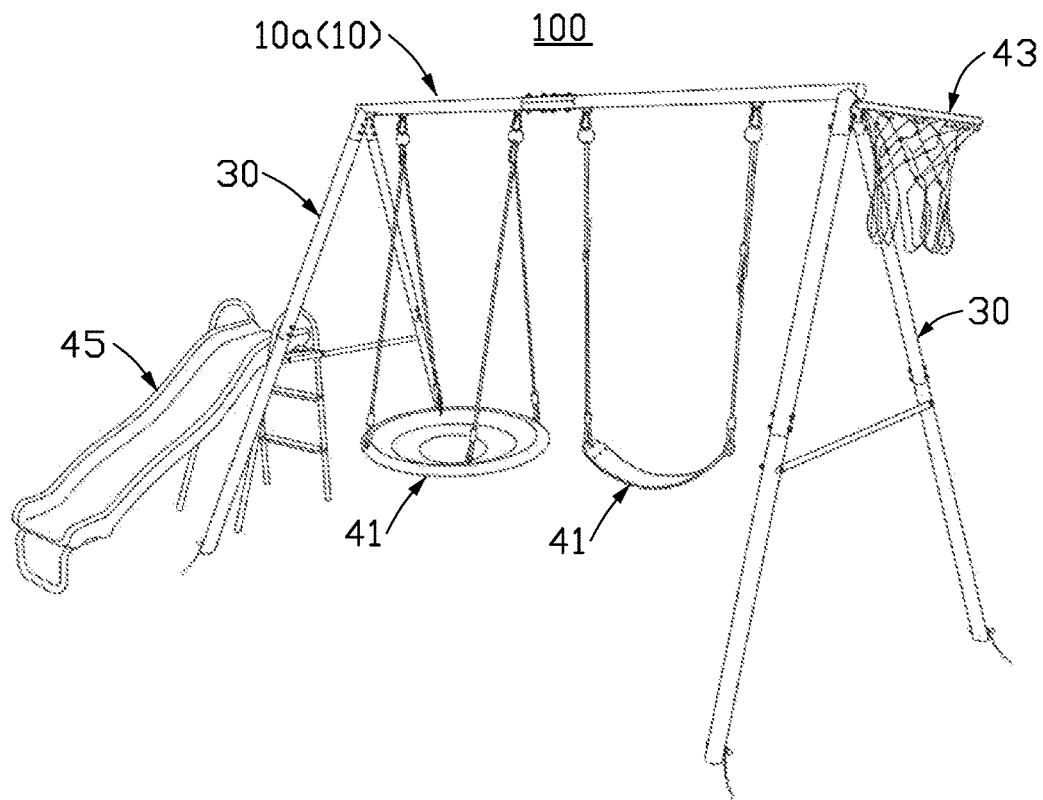
FIG. 17 is a diagram of an embodiment of a swingset according to the present disclosure.

In at least one embodiment, referring to FIG. 17, the swingset 100 may further include a basketball hoop 43, and the basketball hoop 43 is arranged at an end of the cross rod assembly 10a. In at least one embodiment, the basketball hoop 43 may be arranged on the support frame 30.

The swingset 100 may further include a slide 45, the slide 45 is arranged adjacent to the support frame 30 and is connected to the support frame 30.

Figure 18A:
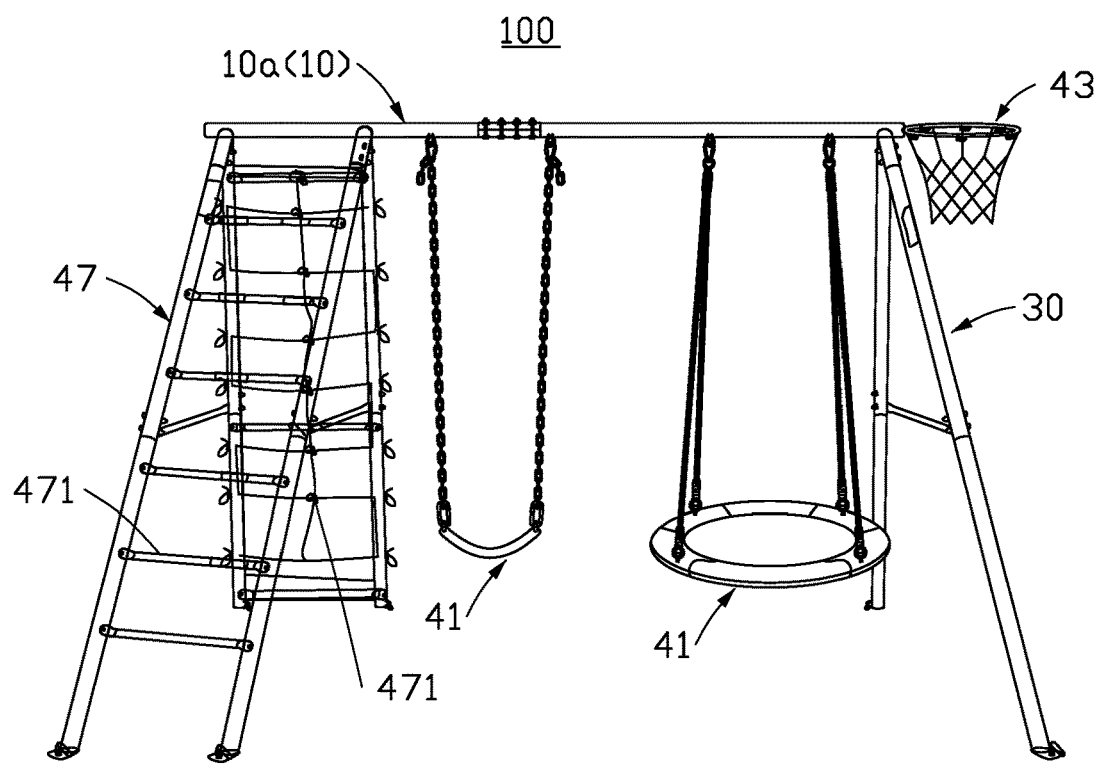
FIG. 18A is a diagram of an embodiment of a swingset according to the present disclosure.

In at least one embodiment, referring to FIG. 18A, the swingset 100 may further include a climbing structure 47, and an end of the climbing structure 47 is attached to the cross rod assembly 10a. In at least one embodiment, the cross rod assembly 10a attached to the climbing structure 47 may be other structures, not limited to the structures described in the foregoing content. For example, the cross rod assembly 10a may be a crossbar or other commonly structures used in the art.

The number of the climbing structures 47 can be varied as needed, which is not limited in the present disclosure.

Figure 18B:
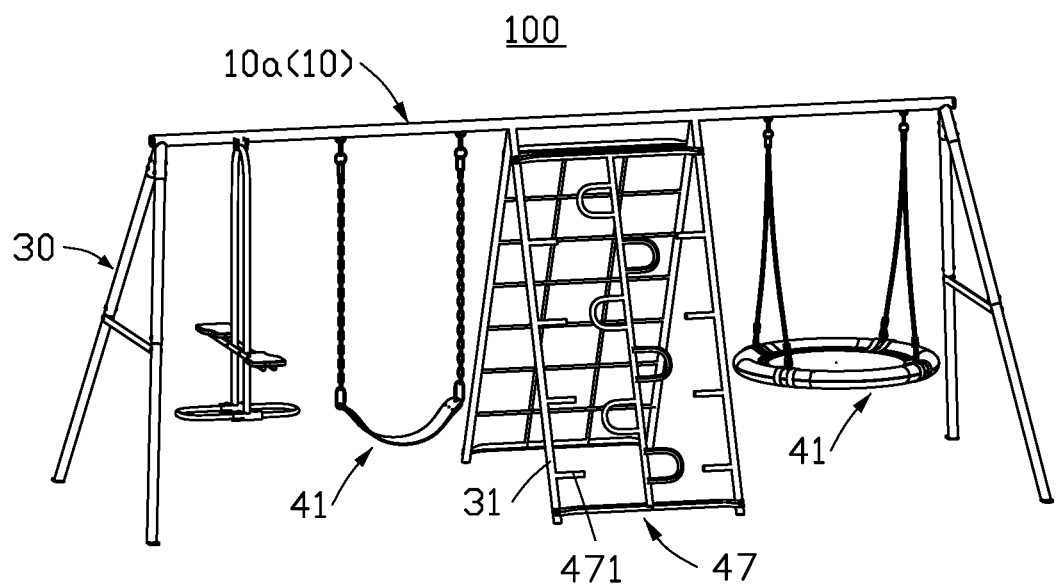
FIG. 18B is a diagram of an embodiment of a swingset according to the present disclosure.
Figure 19:
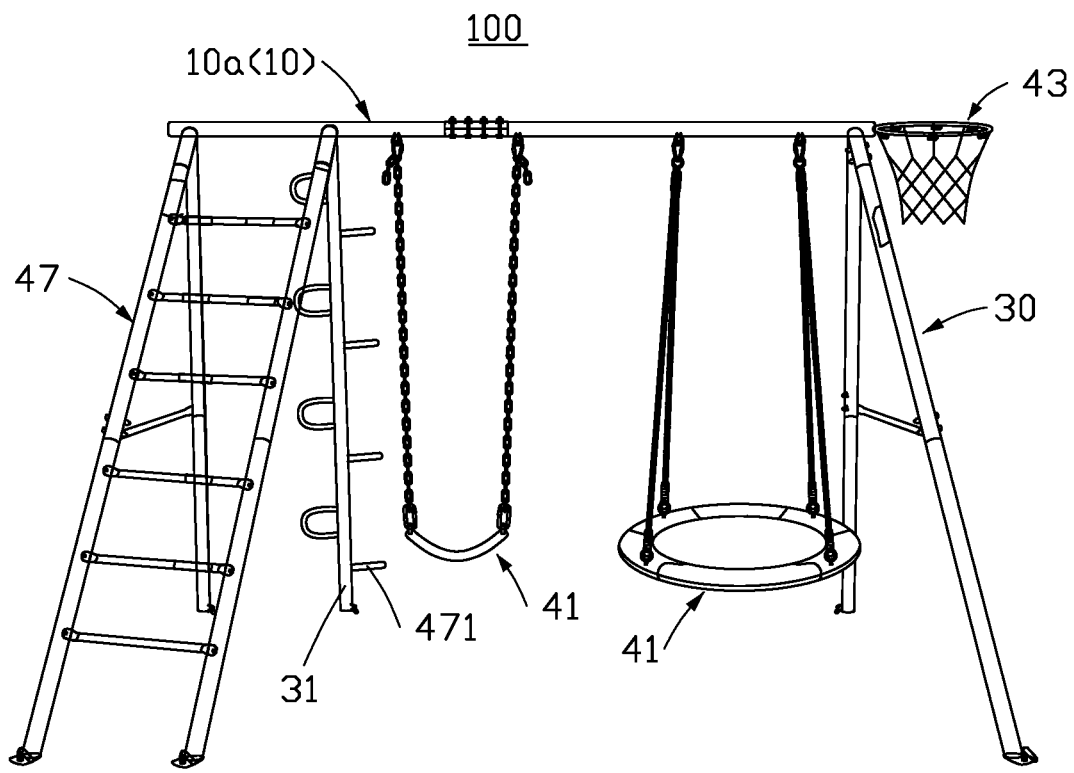
FIG. 19 is a diagram of an embodiment of a swingset according to the present disclosure.

The support frame 30 may be used as a part of a structure of the climbing structure 47. Referring to FIGS. 18A and 18B, the climbing structure 47 includes a climbing assembly 471 connected between two legs 31. The climbing assembly 471 may be a soft rope braided ladder, a steel cable braided ladder, or a horizontal ladder that is not easily deformed, and may also be a trapezoidal structure, a mesh structure, or other structures made of any other material. In at least one embodiment, the climbing structure 47 may be arranged on only one of the legs 31. For example, referring to FIGS. 18B and 19, a plurality of protrusions distributed at intervals can be arranged on the leg 31 for climbing. A plurality of annular structures distributed at intervals may be arranged on the leg 31 for climbing.

Figure 20:
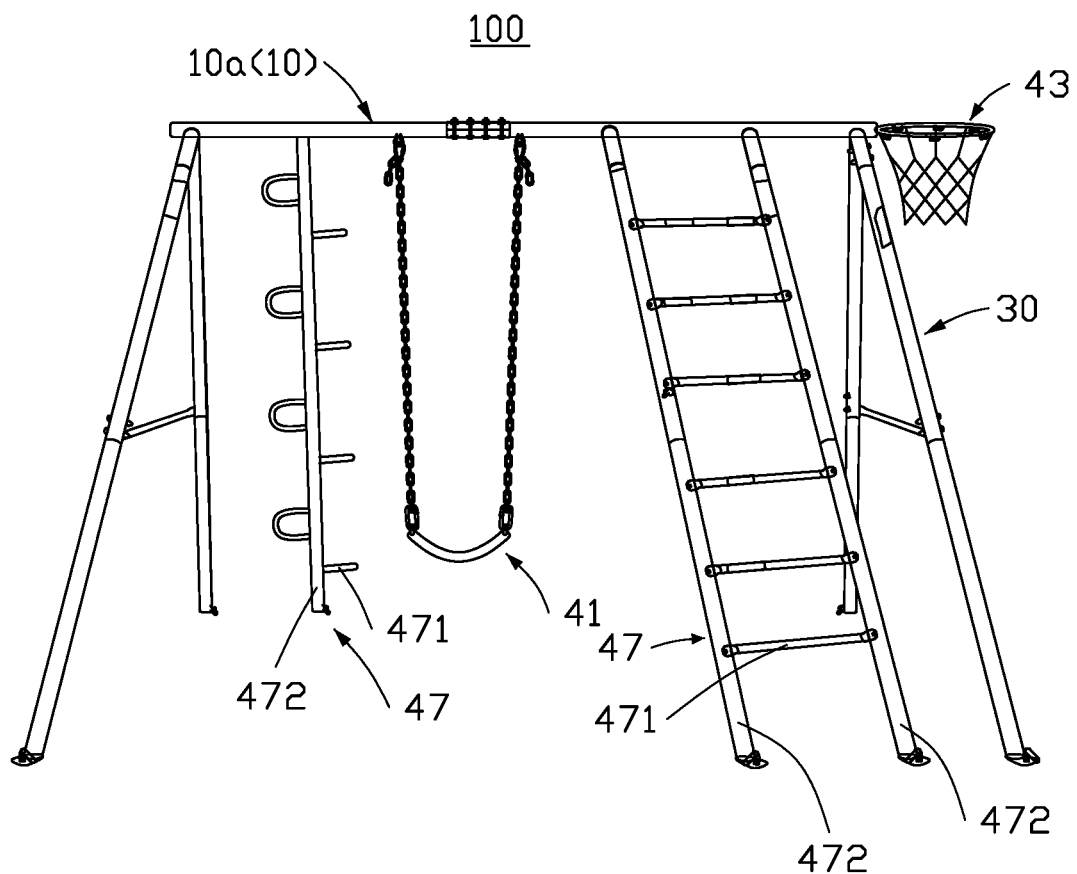
FIG. 20 is a diagram of an embodiment of a swingset according to the present disclosure.

Referring to FIG. 20, the climbing structure 47 includes the climbing assembly 471 and at least one support leg 472. The climbing assembly 471 is disposed between one of the legs 31 and one of the at least one support leg 472 or is connected between two support legs 472. In at least one embodiment, the climbing assembly 471 may be arranged on only one of the at least one support leg 472.

The support leg 472 may include the above connecting rod assembly 10, so that the support leg 472 can be disassembled during transportation, a risk of the support leg 472 being deformed due to being too long during transportation is reduced, and the firmness of a structure of the support leg 472 may be improved, thereby helping to ensure the safety of the swingset and prolong the service life of the swingset.

Figure 21:
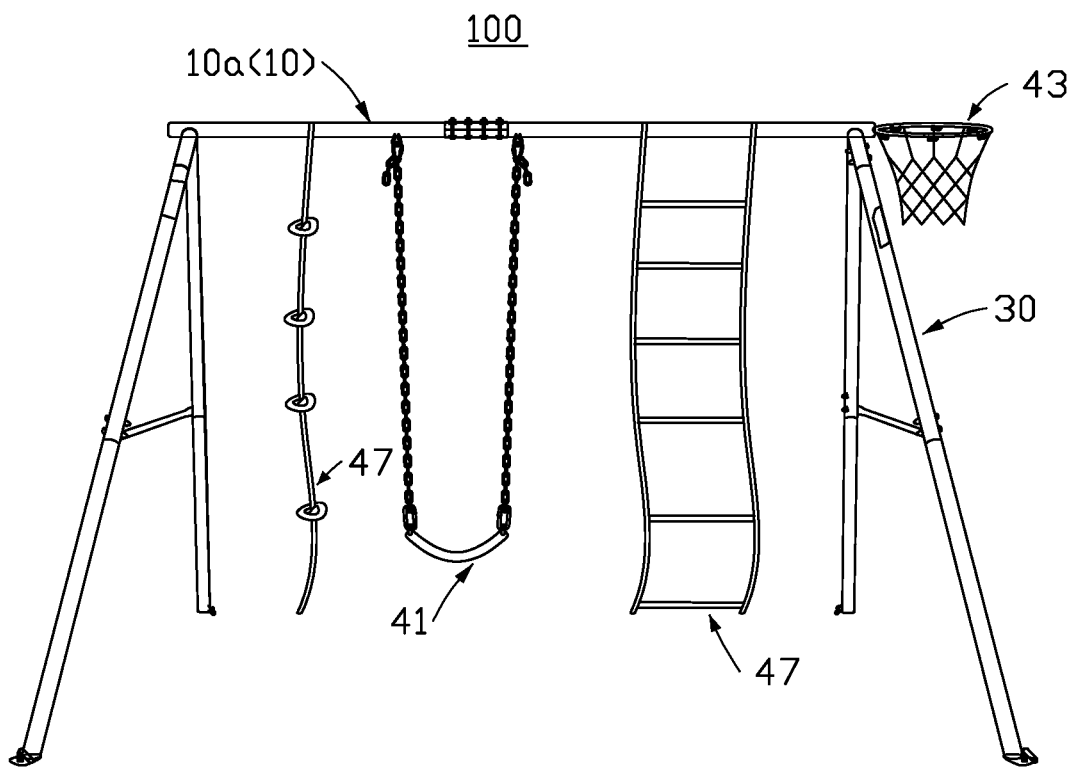
FIG. 21 is a diagram of an embodiment of a swingset according to the present disclosure.

Referring to FIG. 21, the climbing structure 47 may be attached to the cross rod assembly 10a. The climbing structure 47 may be a rope ladder. The climbing structure 47 may be a mesh structure woven by ropes attached to the cross rod assembly 10a, and even more, the climbing structure 47 may be a rope with a plurality of spaced knots attached to the cross rod assembly 10a.

It should be noted that the specific structure of the climbing structure 47 described in the present disclosure is not limited, as long as it can be pedaled and grasped for climbing.

In addition, other recreational structures can be combined with the swingset 100. For example, the other recreational structures may include a playhouse, climbing walls and the like.

In at least one embodiment, the connecting rod assembly 10 and the swingset having the connecting rod assembly 10 described in the present disclosure, the first connecting rod 11 and the second connecting rod 12 are detachably connected, which is conducive to the packaging and transportation of products, and is conducive to reducing the probability of bending and deformation caused by a long length of the connecting rod during transportation. Furthermore, the reinforcing member 13 is arranged at the joint A of the first connecting rod 11 and the second connecting rod 12, and the at least one fastener 14 is used to fix the first connecting rod 11, the second connecting rod 12, and the reinforcing member 13. so that the joint A of the first connecting rod 11 and the second connecting rod 12 is not easy to be bent, which is beneficial to ensure the safety of the product and prolong the service life of the product. In addition, the production process of the connecting rod assembly 10 is simple, which may improve the production efficiency of the product. Moreover, the reinforcing member 13 can be very stably fixed at the joint of the first connecting rod 11 and the second connecting rod 12 by the at least one fastener 14, so that the product has a stable structure and is easy to be assembled.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:
1. A swingset comprising:
at least two support frames distributed at intervals, each of the at least two support frames comprising at least one leg; and a connecting rod assembly configured to connect the at least two support frames, the connecting rod assembly having a length direction and comprising:
  a first connecting rod;
  a second connecting rod, the first connecting rod and the second connecting rod arranged in sequence along the length direction; and
  a reinforcing member overlapping a joint of the first connecting rod and the second connecting rod, and the reinforcing member detachably connected to the first connecting rod and the second connecting rod, wherein the reinforcing member is configured to disperse force at the joint of the first connecting rod and the second connecting rod during operation of the swingset, and weaken tension at the joint during operation of the swingset.

2. The swingset of claim 1, wherein the reinforcing member is received in the first connecting rod and the second connecting rod.

3. The swingset of claim 1, wherein the reinforcing member is mounted on an outer surface of the first connecting rod and an outer surface of the second connecting rod.

4. The swingset of claim 3, wherein the connecting rod assembly further comprises a connecting member, at least one of the first connecting rod and the second connecting rod is sleeved on the connecting member.

5. The swingset of claim 4, wherein at least two mounting holes are defined in the connecting member, and the at least two mounting holes have a distribution length along the length direction; at least one fastener extends through the mounting holes and detachably connects the connecting member, the reinforcing member, the first connecting rod, and the second connecting rod together along the length direction, a length of the reinforcing member is greater than or equal to the distribution length of the mounting holes on the connecting member.

6. The swingset of claim 1, wherein in a cross-section perpendicular to the length direction, the reinforcing member overlaps at least one third of a perimeter of the first connecting rod, and the reinforcing member overlaps at least one third of a perimeter of the second connecting rod.

7. The swingset of claim 1, wherein the reinforcing member comprises a reinforcing sheet, the reinforcing sheet is in contact with the first connecting rod and the second connecting rod respectively.

8. The swingset of claim 1, wherein the reinforcing member comprises two reinforcing sheets, each of the reinforcing sheets is in contact with the first connecting rod and the second connecting rod respectively, the reinforcing sheets are arranged oppositely, at least one fastener further fixes the first connecting rod, the second connecting rod, and the reinforcing sheets together.

9. The swingset of claim 1, wherein the reinforcing member comprises a sleeve, and the sleeve is sleeved on the first connecting rod and the second connecting rod.

10. The swingset of claim 9, wherein the sleeve comprises a slit, opposite ends, an inner surface connecting the opposite ends, and an outer surface facing away from the inner surface, the slit extends from one of the ends of the sleeve toward the other end of the sleeve and penetrates the inner surface of the sleeve and the outer surface of the sleeve.

11. The swingset of claim 4, wherein the connecting member extends along the length direction from an end of the second connecting rod, the connecting member and the second connecting rod are integrally formed, an end of the first connecting rod is sleeve on the connecting member, the reinforcing member is correspondingly positioned to the connecting member.

12. A swingset comprising:
  at least two support frames distributed at intervals, each of the at least two support frames comprising at least one leg; and
  a cross rod assembly detachably connected to the support frames and comprising a connecting rod assembly, the connecting rod assembly having a length direction and comprising:
    a first connecting rod;
    a second connecting rod;
    a reinforcing member; and
    at least one fastener;
  wherein the first connecting rod and the second connecting rod are arranged in sequence along the length direction, the reinforcing member overlaps a joint of the first connecting rod and the second connecting rod, the at least one fastener detachably fixes the reinforcing member, the first connecting rod, and the second connecting rod together; in a cross-section perpendicular to the length direction, the reinforcing member overlaps at least one third of a perimeter of the first connecting rod, and the reinforcing member overlaps at least one third of a perimeter of the second connecting rod; each of the at least one leg of the support frames is connected to the cross rod assembly.

13. The swingset of claim 12, wherein the reinforcing member is mounted on an outer surface of the first connecting rod and an outer surface of the second connecting rod, the connecting rod assembly further comprises a connecting member, at least one of the first connecting rod and the second connecting rod is sleeved on the connecting member.

14. The swingset of claim 13, wherein at least two mounting holes are defined in the connecting member, and the at least two mounting holes have a distribution length along the length direction; the at least one fastener extends through the mounting holes and connects the reinforcing member, the first connecting rod, and the second connecting rod together; along the length direction, a length of the reinforcing member is greater than or equal to the distribution length of the mounting holes on the connecting member.

15. The swingset of claim 12, wherein the reinforcing member comprises a reinforcing sheet, the reinforcing sheet is in contact with the first connecting rod and the second connecting rod respectively.

16. The swingset of claim 12, wherein the reinforcing member comprises two reinforcing sheets, each of the reinforcing sheets is in contact with the first connecting rod and the second connecting rod respectively, the reinforcing sheets are arranged oppositely, the at least one fastener further fixes the first connecting rod, the second connecting rod, and the reinforcing sheets together.

17. The swingset of claim 12, wherein the reinforcing member comprises a sleeve, and the sleeve is sleeved on the first connecting rod and the second connecting rod.

18. The swingset of claim 17, wherein the sleeve comprises a slit, opposite ends, an inner surface connecting the opposite ends, and an outer surface facing away from the inner surface, the slit extends from one of the ends of the sleeve toward the other end of the sleeve and penetrates the inner surface of the sleeve and the outer surface of the sleeve.

19. The swingset of claim 13, wherein the connecting member extends along the length direction from an end of the second connecting rod, the connecting member and the second connecting rod are integrally formed, an end of the first connecting rod is sleeve on the connecting member, the reinforcing member is correspondingly positioned to the connecting member.

20. The swingset of claim 11, wherein each of the at least one leg comprises the connecting rod assembly.

21. The swingset of claim 11, wherein each of the support frames comprises two legs and further comprises a lateral support member and a reinforcing support member, the lateral support member is connected between the legs, and one end of the reinforcing support member is connected to the lateral support member, the other end extends away from the cross rod assembly.

* * * * *